United States Patent Office 3,304,780
Patented Feb. 21, 1967

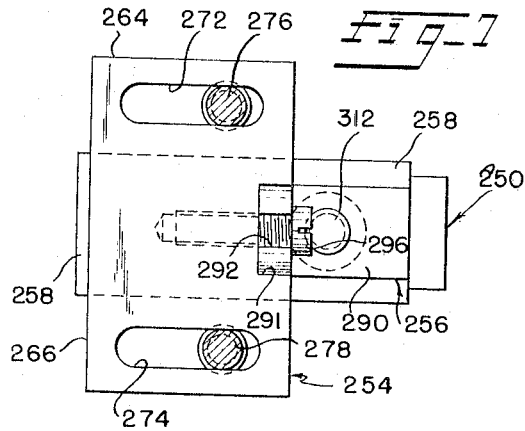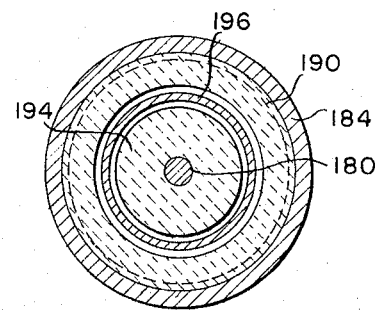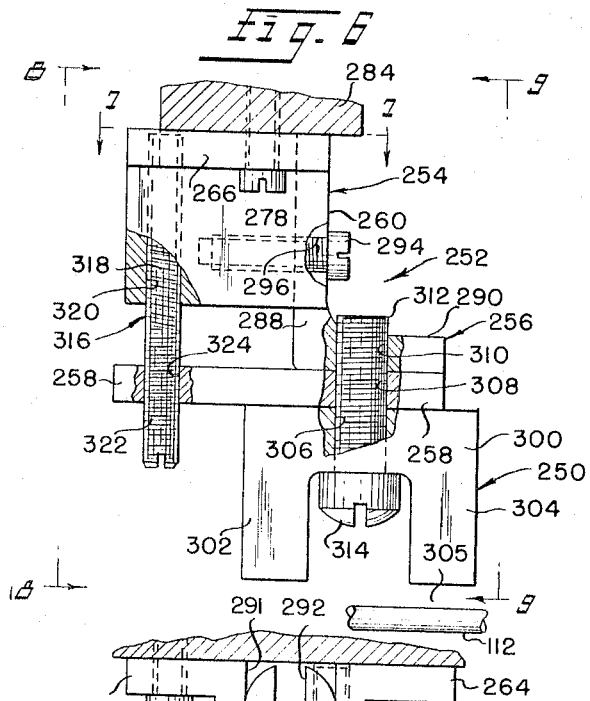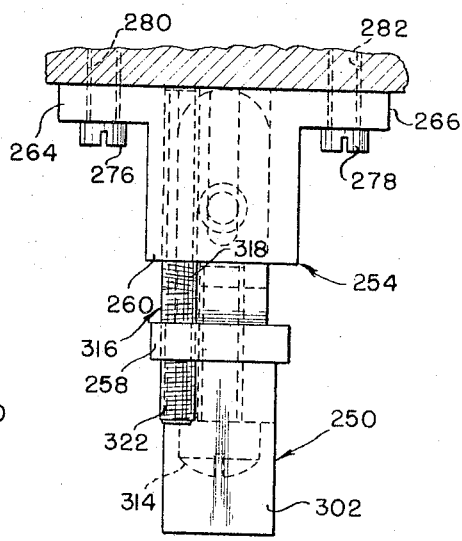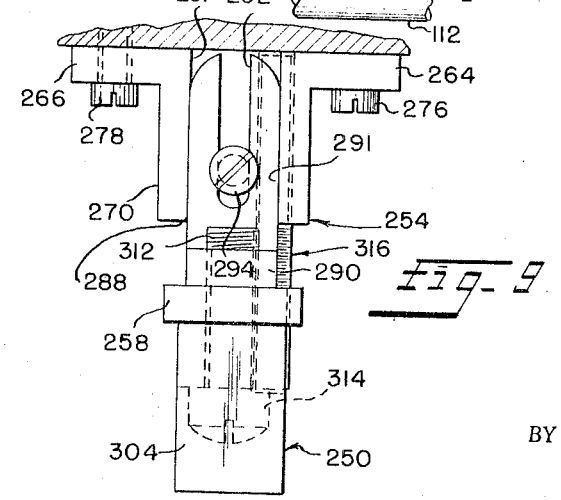

3,304,780
FLUID METER
Winston F. Z. Lee, Verona, Harry W. Fisher, Pittsburgh, and Howard J. Evans, Dubois, Pa., assignors to Rockwell Manufacturing Company, Pittsburgh, Pa., a corporation of Pennsylvania
Filed Oct. 25, 1963, Ser. No. 319,027
11 Claims. (Cl. 73—231)

The present invention relates to fluid meters and more particularly to improvements in fluid turbine meters.

The present invention generally contemplates the provision of a novel turbine meter for accurately metering and registering the flow of fluids and, in its preferred form, basically comprises a flow responsive bladed metering turbine element disposed within a tubular housing and mounted on a fluid guide structure defining a venturi of hollow form with the housing for guiding the fluid to be metered through the blades of the metering element.

In one of its more important aspects, this invention is directed to a novel fluid guide structure consisting essentially of a three-part core assembly in which a central core mounted on the housing axially between and independently of two end cores compactly carries the metering element and part of a register drive train. The central core together with the measuring equipment supported thereon is removable as a unit through a transverse opening in the housing of the meter. This aspect of the present invention provides a more compact, efficiently organized, and repairable turbine meter wherein the assembly and disassembly of the component meter parts is easily and quickly facilitated with optimum sealing and other protection against erosion and corrosion by line fluid.

In another of its important aspects, the present invention contemplates a novel magnetic suspension assembly for the metering rotor output shaft. This suspension assembly of the invention comprises a permanent magnet which is adjustably mounted in a unique manner to minimize the radial load and wear on the rotor shaft bearings.

Prior to this invention, rotor shaft suspension magnets were non-adjustably mounted in place. Although this provided a workable suspension, it did not minimize radial loads and objectionable frictional drag since proper alignment with shaft center of gravity and an optimum magnet air gap could not be consistantly achieved owing to small variations in weight and in size of components from meter to meter. As a result, frictional retarding forces attributable to air gaps of improper dimension or to misalignment of the magnet with the shaft gravitational center line produced corresponding uncompensatable metering inaccuracies.

With the suspension adjustment of the present invention, however, variations in the location of the rotor shaft and in the center of gravity of the shaft assembly are readily compensated for when the meter parts are assembled.

In another of its important aspects the present invention contemplates a meter register drive train having an improved magnetic coupling assembly in which the coupling is disposed in an upstanding shaft assembly extending normal to the rotational axis of the rotor output shaft. The drive and follower magnetic elements of the coupling are respectively disposed on opposite sides of a simplified nonmagnetic flux transmitting partition which forms a fluid tight seal between the metering rotor and the meter register. With this construction, the components carried by the central core piece of the three-piece core assembly are more compactly and efficiently arranged. In addition, this aspect of the invention eliminates the application of the dead weight of the magnetic coupling on the rotor output shaft to thereby reduce the radial load which the rotor shaft suspension magnet is required to counterbalance.

Accordingly, it is, in general, the major object of the present invention to provide a novel fluid meter structure which measures flow of fluids with improved accuracy, which has optimum sealing and other protection against erosion and corrosion by line fluid, and which is relatively easy to assemble and dismantle.

A more specific object of the present invention is to provide a novel metering rotor antigravitational magnetic suspension assembly wherein the position of the suspension magnet is adjustable to assure accurate alignment of the resultant magnetic force with the gravitational center of the rotor assembly and further to establish an optimum air gap between the rotor assembly output shaft and the poles of the suspension magnet.

Another more specific object of the present invention is to provide a novel fluid meter structure wherein a metering rotor support core is mounted for removal with a register assembly independently of internally mounted end cores.

A further object of the present invention is to provide a novel fluid meter structure wherein the metering rotor is rotatably supported in a chamber that is isolated from contact with line fluid except through an opening through which the rotor blades project.

Another object of the present invention is to provide a novel fluid meter structure wherein an internal metering rotor support core is carried by a register assembly component which forms a part of a static fluid tight envelope sealing the register unit from fluid passing through the meter.

Still another object of the present invention is to provide a novel fluid meter structure wherein an internal rotor support core is formed with an accurately dimensioned annular fluid flow passage which is spanned by the metering rotor blades.

Still another object of the present invention is to provide a novel meter structure wherein a rigidly mounted register drive train has a magnetic coupling disposed in parallel spaced relation to a magnetic force applied by a rotor assembly suspension magnet.

Further objects of the invention will appear as the description proceeds in connection with the appendent claims and the annexed drawings wherein:

FIGURE 5 is an enlarged section taken substantially along lines 5—5 of FIGURE 2;

FIGURE 6 is an enlarged partially sectioned, fragmentary elevation of the rotor magnetic suspension assembly illustrated in FIGURES 1 and 2;

FIGURE 7 is a section taken substantially along lines 7—7 of FIGURE 6;

FIGURE 8 is a view taken substantially along lines 8—8 of FIGURE 6; and

FIGURE 9 is a view taken substantially along lines 9—9 of FIGURE 6.

Figure 1:
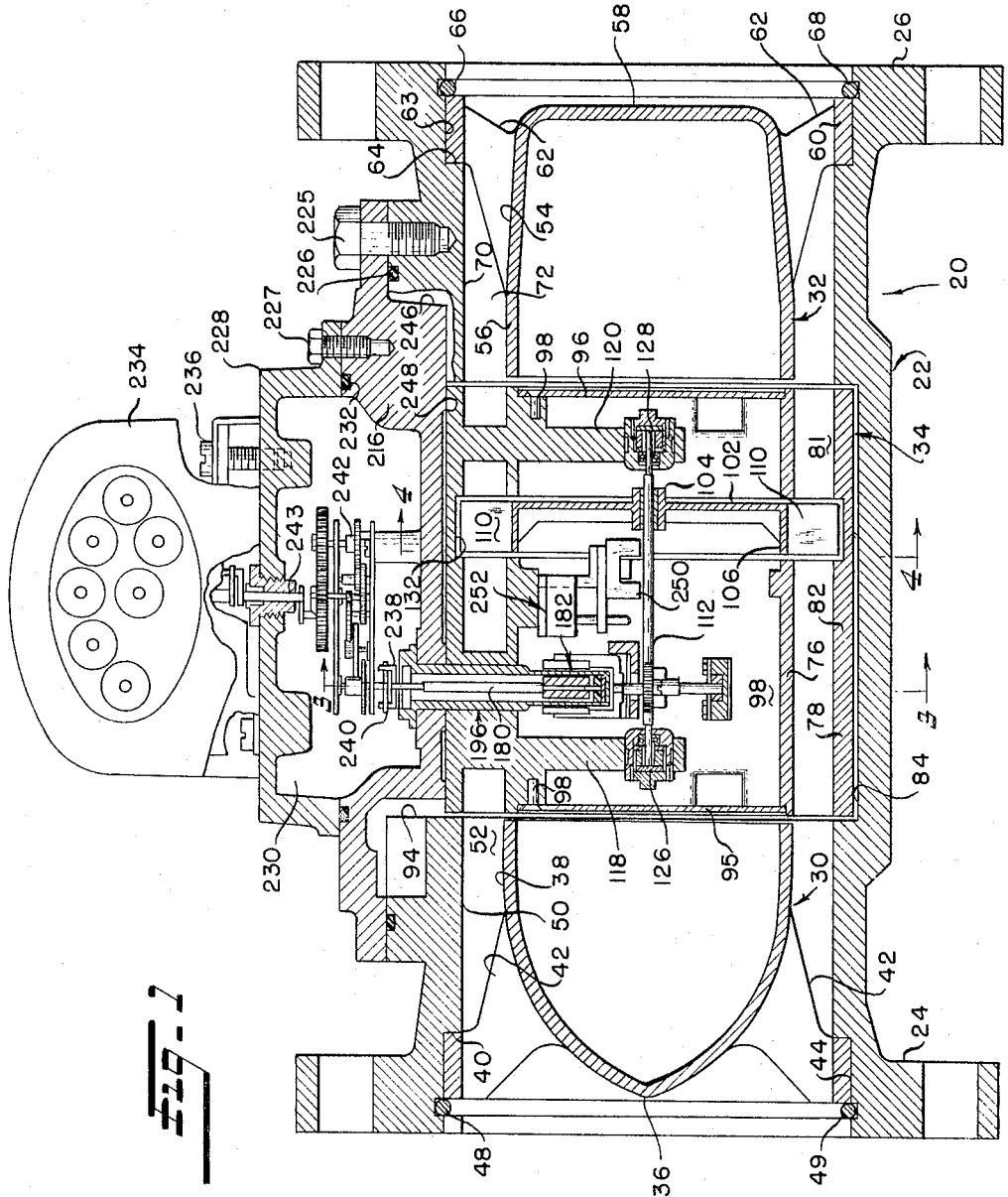
FIGURE 1 is a longitudinal section of a fluid axial flow turbine meter assembly constructed according to a preferred embodiment of the present invention.
Figure 2:
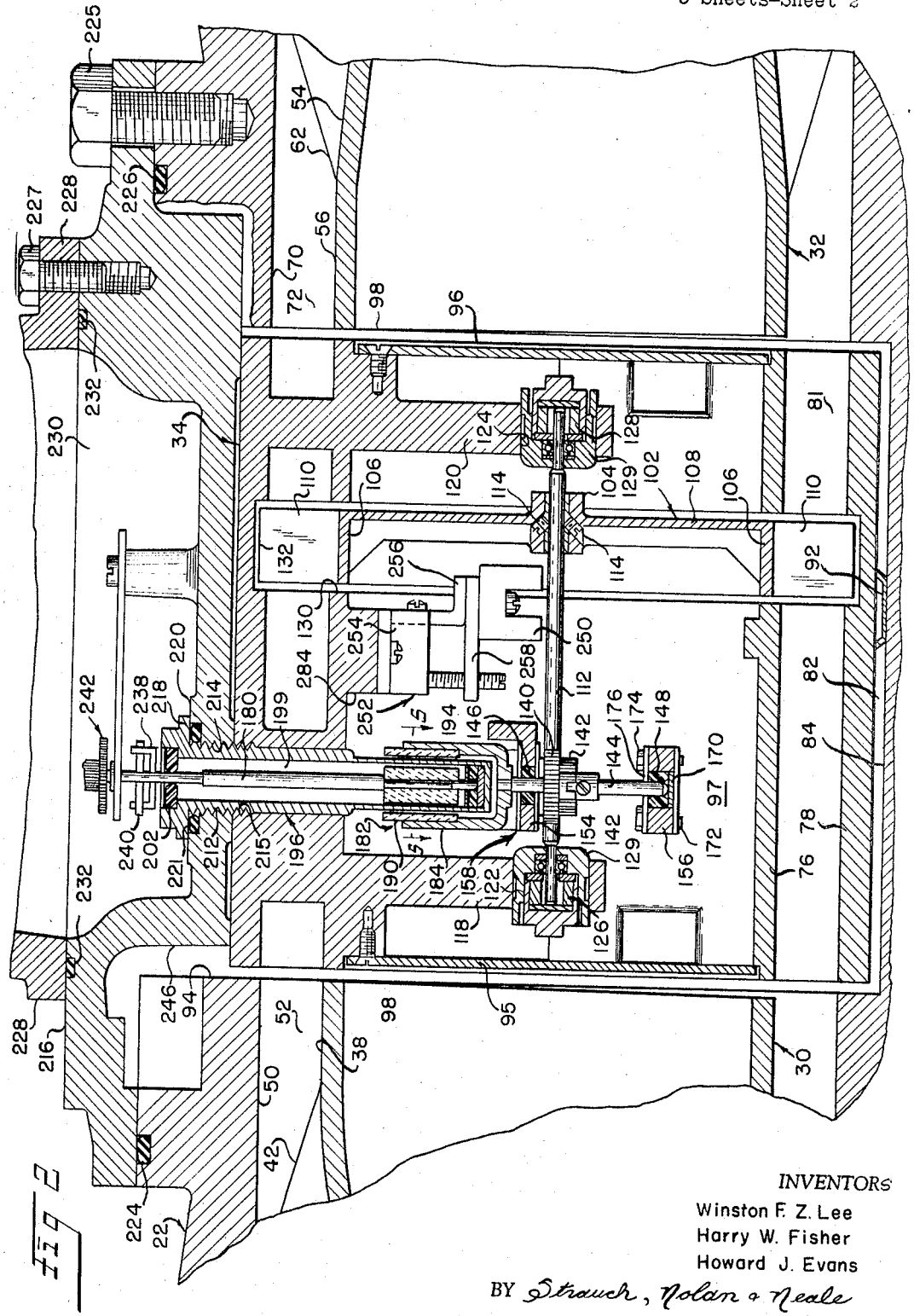
FIGURE 2 is an enlarged fragmentary section of the rotor, register drive train and fluid guide core structure illustrated in FIGURE 1.

Referring now to the drawings and more particularly to FIGURES 1 and 2, the reference numeral 20 generally designates an axial flow turbine meter particularly adapted for use in metering gases and comprising a one-piece cast housing 22 having an essentially tubular configuration and terminating at opposite ends in radially extending pipe attachment flanges 24 and 26. The internal diameter of housing 22 is preferably substantially equal to that of the conduit in which meter 20 is disposed for fluid flow measuring purposes.

In accordance with the present invention, a three-part fluid flow guide structure mounted within housing 22 consists of an upstream core 30, a downstream core 32, and a center core 34 disposed axially between cores 30 and 32. Cores 30, 32 and 34 are mutually coaxially aligned in housing 22 and cooperate to form an annular passage between the inlet end of the meter at flange 24 and the outlet end of the meter at flange 26.

Core 30 is of generally hollowed out cup-like configuration and is formed at its upstream end with a nose portion 36 and at its downstream end with a tubular portion 38 having a uniform external diameter. Nose portion 36, which smoothly merges with tubular portion 38, has a suitable diverging cross-section in the direction of fluid flow to convert the flow of gas or other fluid being metered from a cylindrical stream into an annular stream.

With continued reference to FIGURES 1 and 2, core 30 is coaxially supported in housing 22 by a rim 40 integrally joined to the nose portion 36 by thin equiangularly spaced apart ribs 42 which extend radially outwardly and forwardly toward the upstream end of housing 22. Housing 22 is counterbored at 44 to provide a recess disposed radially inwardly of flange 24 and matingly receiving rim 40. Rim 40 is axially confined between an annular radial shoulder 46 on housing 22 and a split retainer ring 48. Ring 48 is seated in an annular groove 49 formed in housing 22 to thus retain core 30 axially fixed in place.

With continuing reference to FIGURES 1 and 2, housing 22 is formed with a smooth uniformly diameter interior cylindrical wall surface 50 extending axially inwardly from shoulder 46 at least to a region in radial alignment with the inwardly facing downstream end of core 30 to define with tubular portion 38 an annular fluid flow channel 52 having uniformly diametered inner and outer boundaries. The inside diameter of rim 40 is equal to the diameter of wall surface 50 so as to form an uninterrupted continuation of wall surface 50 for guiding fluid through the meter housing.

With continued reference to FIGURES 1 and 2, the downstream core 32 also is of generally hollowed out cup-like configuration and has a cylindrical portion 56 which is axially aligned with and which is equal in diameter to tubular portion 38 of core 30. Core 32 terminates at its downstream end in a blunt nose 58 comprising a straight flat sided wall portion extending normal to the common axis of core 32 and housing 22, thus permitting the metered fluid stream to resume a solid cylindrical configuration.

Core 32 is coaxially supported within housing 22 independently of core member 30 by a rim 60 integrally joined to core 32 as by thin equiangularly spaced apart ribs 62 extending radially outwardly and axially rearwardly toward the downstream end of housing 22. Housing 22 is counterbored at 63 to provide a recess disposed radially inwardly of flange 26 and matingly receiving rim 60. Rim 60 is axially confined between an annular radial shoulder 64 on housing 22 and a split retainer ring 66 seated in an annular housing groove 68 to retain core 32 axially fixed in place in the same manner as core 30.

As best shown in FIGURE 1, housing 22 is formed with a uniformly diametered smooth wall surface 70 axially aligning with wall surface 50. Wall surface 70 has a diameter equal to that of wall surface 50 and extends axially inwardly from shoulder 64 at least to a region in radial alignment with the inwardly facing upstream end of core 32 to define with cylindrical portion 56 an annular flow channel 72 having uniformly diametered inner and outer boundaries in axial alignment with channel 52. The inside diameter of rim 60 is equal to that of wall surface 70 so as to form an uninterrupted continuation of wall surface 70 for guiding fluid through the meter housing.

Figure 3:
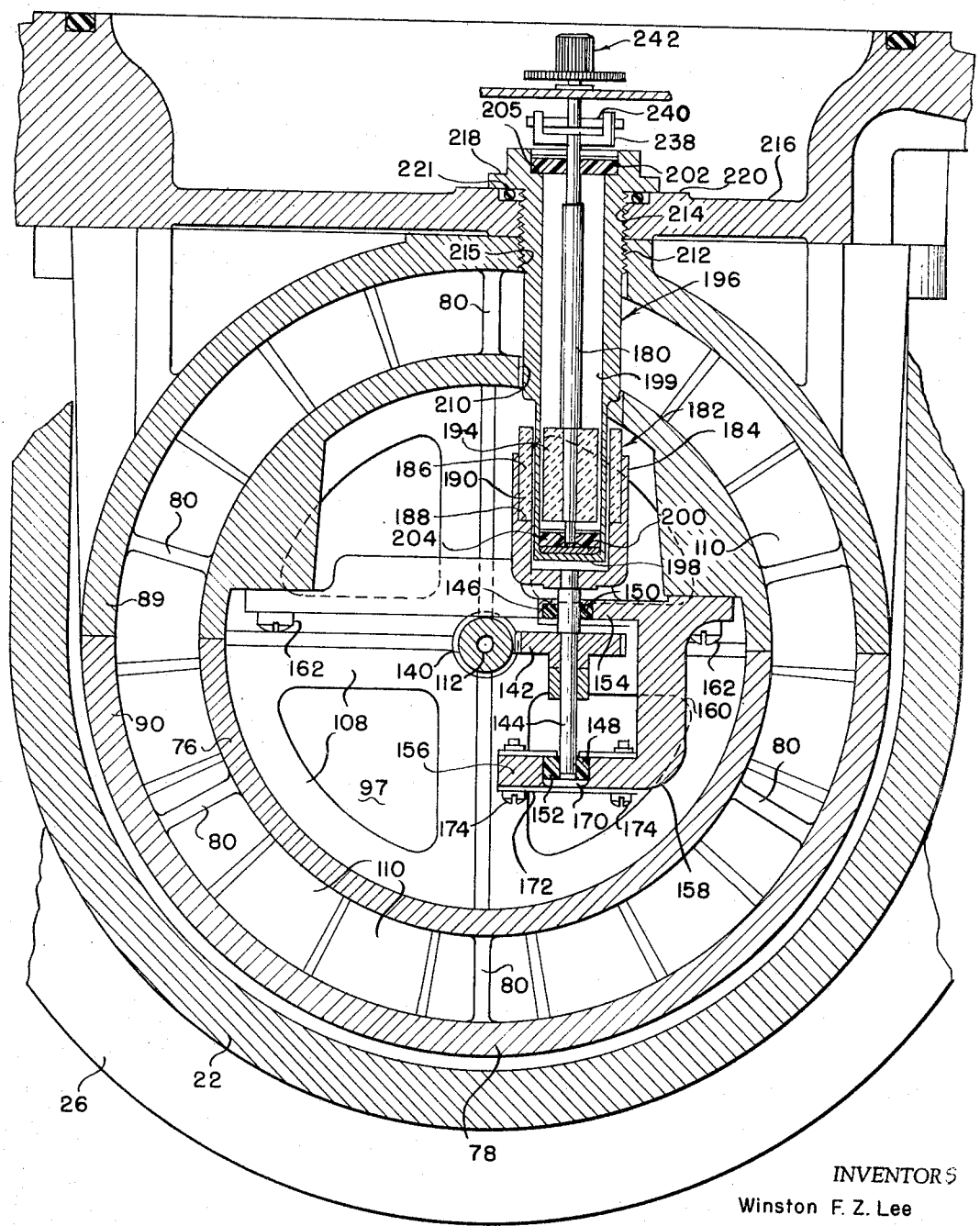
FIGURE 3 is an enlarged section taken substantially along lines 3—3 of FIGURE 1.

With reference now to FIGURES 2 and 3, the center core 34 is formed with inner and outer concentric annular walls 76 and 78 integrally joined together by angularly spaced apart ribs 80 (FIGURE 3) and defining an annular flow channel 81 having concentric inner and outer boundaries equal in diameter to that of channels 52 and 72. The outer wall 78 of core 34 is received in an arcuate recess 82 having an essentially U-shaped configuration and opening radially inwardly axially between housing wall surfaces 50 and 70. Recess 82 is delimited by a smooth bottom wall surface 84 radially outwardly offset from wall surfaces 50 and 70 and having a uniformly diametered semi-circular cylindrical portion circumferentially disposed about the lower half of housing 22.

Advantageously, core 34 is longitudinally split into mating upper and lower sections 89 and 90 (FIGURE 3) abutting along an interface containing the core axis. Sections 89 and 90 are rigidly fixed together by any suitable means (not shown).

Figure 4:
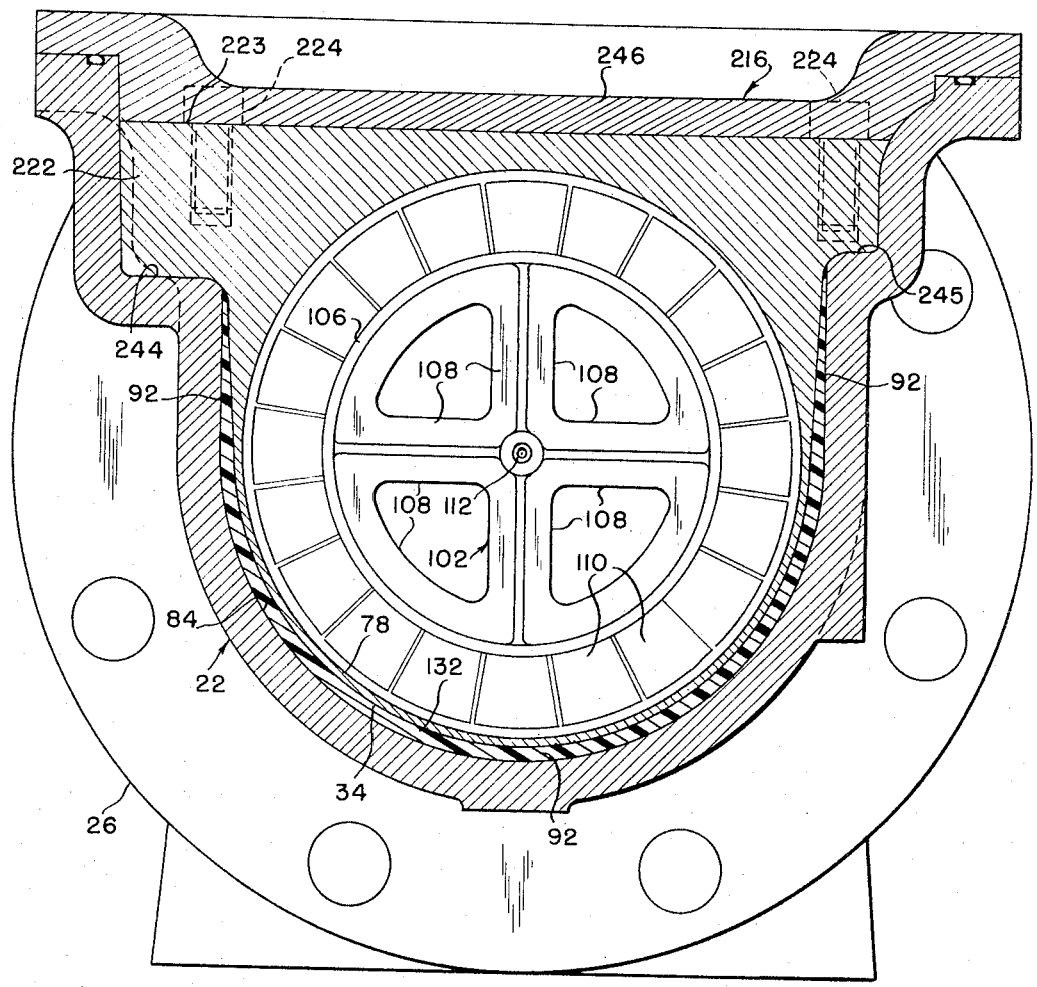
FIGURE 4 is an enlarged section taken substantially along lines 4—4 of FIGURE 1.

With reference now to FIGURES 2-4, core 34 is seated on a seal gasket 92 comprising a flat sided essentially U-shaped resilient strip preferably made of polyethylene or other suitable plastic material. Gasket 92 is seated in fluid tight relationship on wall surface 84 and engages the exterior core wall surface of annular wall 78 to establish a fluid tight seal partially around the periphery thereof. Seal gasket 92 is sufficiently resilient to permit core 34 to be pushed downwardly in the meter assembly until channel 81 axially aligns with channels 52 and 72, thus establishing a through annular fluid passageway from the inlet side to the outlet side of the meter. With this construction, core 34 is supported in housing 22 independently of cores 30 and 32 for a purpose as will presently appear.

In accordance with the present invention, center core 34 is axially spaced apart from end cores 30 and 32 and is removable independently of core members 30 and 32 through a top opening 94 formed in housing 22 midway between end flanges 24 and 26. Opening 94 is generally of circular configuration and formed about an axis which is normal to the longitudinal axis of meter housing 22. The spacing between core 34 and cores 30 and 32 is made sufficiently close so that the small interruptions between channel 81 and channels 72 and 52 has no effect on the fluid flowing therethrough.

As best shown in FIGURES 1 and 2, core 34 is formed radially inwardly of inner wall 76 with a hollow generally cylindrical interior which is closed at its axially spaced ends by flat sided cover plates 95 and 96 to define a chamber 97. Cover plates 95 and 96 are detachably secured to core 34 at right angles to the longitudinal axis of core 34 as by screws 98. In assembled relation, plates 95 and 96 are in tight mating contact with axially oppositely directed annular end faces formed on core 34 to prevent foreign particles in the fluid stream being metered from entering chamber 97 and contacting the moving metering parts housed therein.

With continued reference to FIGURES 2-4, core 34 carries a peripherally bladed metering turbine rotor 102 which is basically designed for gas measurement. Turbine rotor 102 comprises a small central hub integrally joined to a concentric rim 106 by equiangularly spaced apart radially extending rib portions 108. Hub 104, ribs 108 and rim 106 are preferably cast as one-piece from light weight delrin. A plurality of equiangularly spaced apart turbine blades 110 are peripherally mounted on rim 106 and extend radially therefrom. Each blade 110 is so twisted that it has the same angle of attack for uniform axial velocity distribution of inlet flow from the blade root to the blade tip.

With continued reference to FIGURES 2-4 turbine rotor 102 is coaxially mounted on a horizontal metering rotor output shaft 112 and is fixed thereto as by set screws 114. Axially spaced apart rib portions 118 and 120 formed integral with inner wall 76 extend radially inwardly into chamber 97 and are respectively formed with axially aligned bores 122 and 124 extending along the longitudinal axis of metering housing 22 and core 34. Bores 122 and 124 receive antifriction radial and thrust bearing assemblies 126 and 128 which respectively journal the spaced ends of rotor shaft 112 on opposite sides of rotor 102. Bearing assemblies 126 and 128 each are advantageously provided with a housing envelop 129 and may be lubricated by suitable means not shown.

As best shown in FIGURE 2, blades 110 of rotor 102 extend freely and radially through an uninterrupted annular peripherally disposed opening 130 formed in inner wall 76 of core 34. The diameter of the outer surface of wall 76 and the inside diameter of wall 78 delimiting channel 81 are uniform except for the provision of a radially inwardly opening annular recess 132 formed in wall 78 and circumferentially surrounding rotor 102 in radial alignment with opening 130. The outer or blade tip diameter of rotor 102 is substantially equal to or greater than the outside diameter of channel 81. Preferably, the tips of blades 110 protrude into recess 132 with ample radial and axial clearance of about 1/16 of an inch or more. This recess structure is referred to as a "turbulent seal" and functions to improve the flatness of the meter accuracy or registration curve.

Owing to the unusually large clearance that can be provided with the turbulent seal without encountering leakage through blade tip clearance, any potential trouble attributable to entrained particles in the fluid being metered is eliminated, as well as eliminating the necessity of providing for close manufacturing clearances with resultant lower manufacturing costs. Preferably the diameters of the inner and outer boundaries of the annular stream of fluid flowing through channel 81 are uniform and are respectively greater than the rotor blade root diameter and smaller than the rotor blade tip diameter.

From the foregoing description of central core 34, it is clear that chamber 97 is isolated from communication with fluid flowing through the housing 22 except through opening 130. Rotor rim 106 is advantageously disposed in opening 130 to leave on either side of rotor 102 only a very small unblocked space through which fluid can possibly enter chamber 97. As a result, the parts located in chamber 97 are out of the fluid flow path through the meter and thus are substantially protected from damage or deterioration by fluid being metered.

As best shown in FIGURE 2, a worm 140 secured to shaft 112 axially between bearing assembly 126 and rotor 102 constantly meshes with a gear 142 which is fixedly secured on a vertical shaft 144. Shaft 144 is journalled in upper and lower radial bearings 146 and 148, each comprising a bushing preferably made of Rulon. The rotational axis of shaft 144 extends at right angles to and is laterally offset from the rotational axis of shaft 112.

As best seen from FIGURE 3, bearings 146 and 148 are respectively disposed axially above and below gear 142 and are respectively coaxially received with press fits in axially aligned bores 150 and 152 formed in parallel arms 154 and 156 of a one-piece mounting bracket 158. Arms 154 and 156 extend substantially normal to the rotational axis of shafts 112 and 144 and are integrally joined together by a cross piece 160. Bracket 158 is fixed to core 34 by machine screws 162 extending through opposite ends of arm 154 which spans the core interior.

With continuing reference to FIGURE 3, the lower end of shaft 144 seats on a thrust bearing 170 comprising a flat sided plate made of hardened steel and mounted on an end plate 172 which is fixed to bracket arm 156 by nut and bolt assemblies 174. Bearing 148 is seated on thrust bearing 170 and is axially confined in place between bearing 170 and a retaining collar 176 secured by assemblies 174 to bracket arm 156.

Shaft 144, as best shown in FIGURE 3, is drivingly connected to a register index shaft 180 by a radial gap type magnetic coupling generally indicated at 182. Coupling 182, as shown in FIGURES 2, 3 and 5, comprises an upwardly opening cup shaped drive magnet holder 184 coaxially fixed to the upper end of shaft 144 vertically above bearing 146. Holder 184 is preferably made of aluminum and is counterbored at 186 to provide a radial shoulder 188 on which an annular drive magnet 190 is seated in axially aligned relation to the rotational axis of shaft 144. Coupling 182 has a cylindrical follower magnet 194 fixed to the lower end of shaft 180 and cooperating with drive magnet 190 through a tubular partition 196 of non-magnetic metallic material.

With continued reference to FIGURES 2, 3 and 5, partition 196 is closed at its lower end by an end wall 198 to form an upwardly opening well 199 coaxially receiving shaft 180. The lower end of shaft 180 engages a thrust bearing 200 seated on end wall 198. As shown, shaft 180 is disposed in axially aligned, spaced apart relationship above shaft 144 and is radially journalled at its upper and lower ends by bushings 202 and 204 respectively. Bushing 204 is seated on bearing 200 at the bottom of well 199 and busing 202 is seated on an annular shoulder 205 formed in partition 196 adjacent the upper end thereof.

Magnets 194 and 190 are axially coextensive in length and are respectively rotatable in concentric inner and outer circular paths extending coaxially with the rotational axes of shafts 180 and 144 respectively. Partition 196 is disposed between and in radially spaced relation to magnets 190 and 194. Preferably, magnets 190 and 194 are of the ceramic type molded to suit space conditions. Coupling 182 is advantageously of the attractive type wherein the cooperative flux linked drive magnet poles and followed magnet poles are of opposite polarity. With this construction, drive magnet 190 attractively rotates follower magnet 194 upon rotation of rotor 102.

With continuing reference to FIGURES 2 and 3, the upper end of partition 196 extends freely through an opening 210 formed in core wall 76 and is provided with an externally threaded section 212 which is threadedly received in axially aligned tapped bores 214 and 215 formed in a top plate 216 and in core wall 78 respectively. The end of partition 196 protruding upwardly beyond bore 214 is formed with an integral flange 218 which tightly and matingly abuts a raised annular flat face 220 formed on top plate 216. By threading partition 196 downwardly into bore 214, flange 218 is drawn tight against face 220 and compresses a sealing O-ring 221 seated in an annular recess surrounding threaded section 212. Partition 196 thus fixes top plate 216 and core 34 together as a unit and forms a static fluid tight seal between magnets 190 and 194 to prevent leakage of fluid from the interior of housing 22.

As best shown in FIGURES 3 and 4, core 34 is formed with a hollow boss portion 222 projecting integrally upwardly from core section 89 and terminating in an outwardly extending rectangular flange 223 matingly bearing against the bottom of plate 216. Machine screws indicated at 224 and extending through flange 223 fixedly secure core 38 to plate 216.

As shown in FIGURES 1 and 2, top plate 216 is fixed to housing 22 over opening 94 by cap screws indicated at 225. A resilient O-ring and annular groove assembly 226 establishes a fluid tight seal between the mating faces of top plate 216 and housing 22. Fixed as by cap screws 227 vertically above shaft 180 on top of plate 216 is a register mounting plate 228 which defines with top plate 216 a register gear box indicated at 230. A resilient O-ring and annular groove assembly 232 establishes a fluid tight seal between the mating surfaces of plates 216 and 228. A conventional meter register 234 is mounted on plate 228 by screws 236.

As shown in FIGURES 1–3, the upper end of index shaft 180 projecting into gear box 230 has fixed thereto a dog 238 which engages with a complemental dog 240. Dog 240 is coupled to a conventional register reduction drive gear train assembly 242 made up of shaft mounted intermeshing gear and pinion sets to establish a drive connection between shaft 180 and a register input shaft 243 of register 234. With this meter structure, rotor 102 rotates only in response to flow of fluid through channel 81 and the number of turns made by the rotor are registered in convenient units by register 234.

As best shown in FIGURE 4, the core boss portion 222 is seated on spaced apart ledges 244 and 245 disposed on opposite sides of rotor 102. Plate 216 has a lower portion 246 extended downwardly through opening 94 and matingly abutting the upwardly facing surface of boss portion 222 to establish a seal therewith. Seal gasket 92 extends around core 34 and terminates at ledges 244 and 245 in the manner shown.

In order to lessen the radial load and wear on bearing assemblies 126 and 128, a magnetic suspension is provided for shaft 112, which is made of magnetic material. This magnetic suspension, as shown in FIGURES 6–9, comprises a permanent horseshoe magnet 250 adjustably mounted in place by a novel bracket assembly generally indicated at 252.

With continued reference to FIGURES 6–9, the principal components of bracket assembly 252 are a guide block 254, a locking bracket 256, and a magnet mounting plate 258. Guide block 254 is formed with a generally box-shaped body portion 260 and top horizontal flat-faced, laterally projecting flange portions 264 and 266. Flange portions 264 and 266 are respectively formed with parallel spaced apart elongated apertures 272 and 274 (FIGURE 7). Machine screws 276 and 278 respectively extending upwardly through apertures 272 and 274 are threaded into parallel tapped bores 280 and 282 (FIGURE 8) provided in a radial boss portion 284 formed integral with core 34. The axes of bores 280 and 282 are parallel and are contained in a common plane extending at right angles to the rotational axis of shaft 112. Thus, by loosening screws 276 and 278, guide block 254 is bodily adjustable longitudinally with respect to shaft 112.

With continuing reference to FIGURES 6–9, mounting bracket 256 comprises an essentially L-shaped member having generally mutually perpendicular arm portions 288 and 290. Arm portion 288 is slidably received in a flat-bottomed vertical groove 291 formed in the rear end face of guide block 254 medially between apertures 272 and 274. Bracket 256 is vertically adjustably secured to guide block 254 by a locking screw 294 which extends through a narrow vertical slot 292 formed in arm portion 288 and which is threaded into a tapped blind bore 296 formed in guide block 254 along an axis extending at right angles to bores 280 and 282.

As best shown in FIGURE 6, magnet 250 is formed with a cross-piece 300 integrally joining coextensive parallel arm portions 302 and 304 which terminates in oppositely polarized magnetic poles. The poles of magnet 250 are radially, equidistantly spaced above shaft 112 to provide an air gap indicated at 305.

Cross-piece 300 of magnet 250 is formed with a smooth cylindrically walled bore 306 extending midway between and parallel to arm portions 302 and 304. Bore 306 axially aligns with a smooth cylindrically walled bore 308 in plate 258 and with a tapped bore 310 formed in bracket arm portion 290. A machine screw 312 having an enlarged head 314 abutting the underside of cross-piece 300 extends coaxially through bores 306 and 308 and is threadedly received in bore 310 to rigidly secure magnet 250 to bracket 256 and to clamp plate 258 between the opposed surfaces of bracket arm 290 and cross-piece 300. Bore 310 in bracket arm 290 is formed along an axis normally intersecting the axis of bore 296. Thus, by loosening screw 312, magnet 250 may be adjustably rotated to move the magnetic poles in arm portions 302 and 304 in a circular path about the axis of screw 312.

With continuing reference to FIGURES 6–9, plate 258 extends forwardly from bracket arm portion 290 and has a portion spaced vertically beneath guide block 254. An adjustment screw 316 for vertically adjusting the position of magnet 250 relative to rotor shaft 112 is formed with an upper right hand threaded section 318 received in a tapped bore 320 which is formed in guide block 254 along a vertical axis extending parallel to that of screws 312, 276 and 278. Adjustment screw 316 extends downwardly from guide block 254 and has a lower left hand threaded section 322 received in a taped through bore 324 formed in plate 258 along an axis in axial alignment with the axis of bore 320. The oppositely threaded screw sections 318 and 322 enables the displacement of plate 258 together with magnet 250 in a direction axially opposite to direction of advancement of guide block 254 on screw 316.

The foregoing construction of assembly 252 provides for a three-way adjustment of the position of magnet 250 with respect to shaft 112. First, by loosening screws 276 and 278 the sub-assembly of guide block 254, mounting plate 258 and magnet 250 may be shifted in opposite directions longitudinally with respect to the rotational axis of shaft 112 in order to accurately longitudinally align the resultant magnet force applied by magnet 250 with the center of gravity of the sub-assembly of rotor 102 and shaft 112. Independent of this longitudinal adjustment, screw 312 may be loosened to permit magnet 250 to be rotated about its axis to assure that the poles on the magnet arm portions 302 and 304 radially align with the rotational axis of shaft 112. Finally, the air gap between the magnet poles and shaft 112 may be independently adjusted by loosening lock screw 294 and turning the adjustment screw 316 in either direction for increasing or decreasing the linear distance of the air gap radially between the magnet poles and the periphery of shaft 112. When screw 294 is loosened and screw 316 is thereafter turned, the entire sub-assembly of bracket 256, plate 258, magnet 250 and screw 312 is vertically displaced as a unit. Since magnet 250 is supported by screw 316 after locking screw 294 is loosened, exceptionally fine adjustments may be made in the radial length of the air gap 305. As a result, the air gap can be measured while screw 316 is being turned. When the optimum air gap is established in this manner, locking screw 294 is re-tightened to secure magnet 250 in its adjusted position, assuring that vibrations imparted to the meter through the pipeline does not affect the adjusted setting.

By adjusting magnet 250 in the foregoing manner, a substantially floating frictionless mounting of rotor 102 is effectuated, thus rendering the rotor more responsive to motive fluid flowing through channel 81.

From the foregoing description, it will be appreciated that the meter structure according to the present invention has the combined advantages of a fluid guide core structure of sufficient axial length between the inlet and outlet openings of housing 22 to assure uniform and undisturbed distribution of fluid flow, of a one-piece housing, and of a removable center rotor support core to enable easy and quick assembly and disassembly of the meter parts. In addition, the arrangement of shafts 112, 144 and 180 along with magnetic coupling 182 provide a very compact assembly which is readily mounted in confined core space, but which is still readily accessible for repair or replacement. Also, it is evident that the axes of shafts 144 and 180 and coupling 182 are in parallel spaced apart relationship to the resultant magnetic force applied by magnet 250 to shaft 112 and that shafts 144 and 180 with coupling 182 are rotatably supported independently of shaft 112. As a result, the magnetic attractive force required to suspend rotor 102 and its output shaft 112 for friction-free rotation is appreciably reduced.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid flow meter, a one-piece generally tubular housing having a side opening formed intermediate its ends, a register assembly having a register unit and a multi-component fluid tight envelope extending over said opening and rigidly removeably fixed to said housing, said envelope including a non-magnetic tubular wall portion projecting radially into the interior of said housing, a multi-part fluid guide structure disposed in said housing to define a venturi passage therethrough and including coaxially spaced apart unitary end cores and a central core coaxially disposed between said end cores in spaced relation thereto, said end cores being separately and independently rigidly supported by said housing and being separately removable only through opposite ends of said housing, said central core being rigidly carried by said tubular wall portion for unitary removal with said register assembly through said opening, said central core having inner and outer concentric radially spaced apart wall surfaces defining an annular fluid flow passage forming an intermediate portion of said venturi passage, means providing a continuous peripheral opening in said inner wall surface, a peripherally bladed rotor coaxial with said central core and having its blades projecting through said peripheral opening and spanning said annular passage to be driven by fluid flow therethrough, means defining a chamber in said central core formed inwardly of said inner wall surface and being isolated from communication with said venturi passage except through said peripheral opening, a rotor output shaft carrying said rotor and being coaxially rotatably supported by said central core in said chamber, an axially polarized horseshoe permanent magnet for applying an antigravitational force resultant to the gravitational center of said rotor and said rotor shaft for counter balancing the gravitational forces acting thereon, support bracket means rigidly mounting said magnet in radially spaced relation to said rotor output shaft and comprising first means for adjusting the position of said magnet longitudinally of the rotor rotational axis for aligning said force resultant with said gravitational center, second means for adjusting the position of said magnet radially of said rotor rotational axis for varying the air gap between the magnetic poles and said rotor output shaft, and third means for adjustably rotating said magnet to swing said poles about an axis extending normal to the rotor rotational axis to radially align the magnet poles with the rotational axis of said output shaft, said first, second and third means being operative to effectuate their respective adjustments independently of each other, and drive means for transmitting the rotation of said rotor output shaft to actuate said register unit and comprising coaxially spaced apart drive and driven shafts respectively rotatably supported on said central core exteriorly of said tubular wall portion and on said tubular wall portion interiorly thereof along a common axis extending in parallel spaced relation to said force resultant and perpendicularly of said rotor rotational axis in laterally offset relation to said output shaft, and annular ceramic permanent coextensive concentric magnets respectively carried by said drive and driven shafts and coacting through said tubular wall portion for transmitting rotation of said drive shaft to said driven shaft.

2. In a fluid flow meter, a housing having fluid inlet and outlet openings, a fluid tight register assembly rigidly removably mounted on said housing and including a multi-component envelope and a register unit mounted in said envelope, a multi-part fluid guide structure disposed in said housing to define an annular passage between said inlet opening and said outlet opening, said fluid guide structure comprising axially aligned spaced apart end cores separately and independently rigidly supported by said housing and a central core, a hollow, non-magnetic tubular portion forming a part of said envelope and extending transversely through said passage and into said central core, means securing said central core to said tubular portion for removal from said housing independently of said end cores, a peripherally bladed rotor rotatably carried by said central core to be driven by fluid flow through said passage, and drive means comprising magnetically coacting means disposed interiorly and exteriorly of said tubular portion for transmitting the rotation of said rotor to actuate said register unit.

3. In a fluid flow meter, a generally tubular housing having a side opening, a register assembly extending over said side opening and being removably mounted on said housing, a fluid guide core disposed in the path of fluid flow through said housing and carried as a unit with said register assembly for removal through said side opening, a peripherally bladed rotor rotatably supported by said core, said core comprising inner and outer concentric radially spaced apart surface means for directing motive fluid into, through and from the blades of said rotor in an annular stream, drive means for transmitting the rotation of said rotor to actuate said register assembly, said core being longitudinally split to provide two axially coextensive mutually detachable halves, and bearing means mounted only on one of said halves for journalling said rotor for rotation about an axis extending coaxially with the longitudinal axis of said housing.

4. In a fluid flow meter, a housing having inlet and outlet openings, a register assembly rigidly mounted on said housing, means comprising a fluid flow guide structure disposed in said housing to define a passage of annular cross section between said inlet and outlet openings, a peripherally bladed rotor assembly rotatably supported by said structure with the blades thereof extending into said passage to be driven by fluid flow therethrough, means carried by said structure for applying an antigravitational resultant magnetic force passing through the center of gravity of said rotor assembly perpendicularly of the rotor rotational axis, and drive means for transmitting rotation of said rotor assembly to actuate said register unit, said drive means comprising: drive and driven shafts rotatably supported along a common axis extending substantially parallel to said resultant magnetic force and being laterally offset from said rotor rotational axis, and coacting magnetic means carried by said drive and driven shafts for transmitting rotation of the former to the latter.

5. The fluid flow meter defined in claim 4 wherein said driven shaft is rotatably supported by said register assembly and said drive shaft is rotatably supported by said structure.

6. The fluid flow meter defined in claim 5 wherein said register assembly comprises a multi-component fluid tight envelope having a part rotatably supporting said driven shaft and rigidly carrying said fluid flow guide structure.

7. In a fluid meter, a housing having inlet and outlet openings, means defining a fluid flow passage between said inlet and outlet openings, a metering rotor assembly rotatably supported in said housing and driven by fluid flow through said passage, magnetic means for applying an anti-gravitational force resultant adapted to pass substantially through the gravitational center of said rotor assembly perpendicular to the rotor rotational axis, and means rigidly mounting said magnetic means for independent adjustment in mutually perpendicular rectilinear paths, said means mounting said magnetic means further comprising means for adjustably moving said magnetic means in a closed curvilinear path independently of the adjustment in said rectilinear paths, said curvilinear path extending about an axis that normally intersects a plane containing the rotational axis of said rotor assembly.

8. In a fluid meter, a housing having inlet and outlet openings, means defining a fluid flow passage between said inlet and outlet openings, a metering rotor assembly having an output shaft rotatably supported in said housing and driven by fluid flow through said passage, and axially polarized magnet for applying an anti-gravitational force resultant adapted to pass through the gravitational center of said rotor assembly transversely of the rotor rotational axis for magnetically suspending said rotor assembly, and support bracket means rigidly mounting said magnet in radially spaced relation to said output shaft and including first means for adjusting the position of said magnet longitudinally of the rotor rotational axis for aligning said force resultant with said gravitational center, second means for adjusting the position of said magnet radially of said rotor rotational axis for varying the air gap between the magnet poles and said shaft, and third means for adjustably rotating said magnet to swing the poles thereof about an axis extending perpendicularly to a plane containing said rotor rotational axis to radially align the magnet poles with the axis of said shaft, said first, second and third means being operative to effectuate their respective adjustments independently of each other.

9. In a fluid meter, a housing having inlet and outlet openings, means defining a fluid flow passage between said inlet and outlet openings, a metering rotor assembly having a shaft rotatably supported in said housing and driven by fluid flow through said passage, an axially polarized magnet for applying an anti-gravitational force resultant adapted to pass through the gravitational center of said rotor assembly at right angles to the rotor rotational axis for magnetically suspending said assembly, a support member fixed in predetermined radially spaced relation to said shaft, and mounting means for adjustably shifting said magnet radially of said shaft while maintaining said magnet rigid with said support member, said mounting means comprising a plate member rigid with said magnet and screw means supporting said plate member from said support member, said screw means comprising an element having opposite-hand threaded sections respectively threadedly received in said support member and said plate member.

10. In a fluid meter, a housing having inlet and outlet openings, means defining a fluid flow passage between said inlet and outlet openings, a metering rotor assembly having a shaft rotatably supported in said housing and driven by fluid flow through said passage, an axially polarized magnet for applying an anti-gravitational force resultant adapted to pass through the gravitational center of said rotor assembly at right angles to the rotor rotational axis for magnetically suspending said assembly, a support member fixed in predetermined radially spaced relation to said shaft, and mounting means for adjustably shifting said magnet radially of said shaft while maintaining said magnet rigid with said support member, said mounting means comprising a plate member rigid with said magnet, screw means supporting said plate member from said support member and releasable lock means separate from said screw means for securely fixing said magnet in its adjusted position.

11. The fluid flow meter defined in claim 10 wherein said releasible lock means comprises a mounting member rigidly carrying said magnet and said plate member and being slidably mounted on said support member, and means releasably fixing said mounting member to said support member.

References Cited by the Examiner

UNITED STATES PATENTS

| | | | |
|---|---|---|---|
| 624,142 | 7/1899 | White | 308—10 |
| 771,826 | 11/1904 | Lohse | 73—231 |
| 796,067 | 8/1905 | Duncan | 308—231 |
| 2,962,895 | 12/1960 | Rumble | 73—231 X |
| 3,053,087 | 9/1962 | Waugh | 73—231 |
| 3,060,740 | 10/1962 | Granberg | 73—231 X |
| 3,101,615 | 8/1963 | Pavone | 73—231 |
| 3,135,116 | 6/1964 | Kwong et al. | 73—231 |
| 3,162,042 | 12/1964 | Hart | 73—231 |

FOREIGN PATENTS

| | | |
|---|---|---|
| 230,701 | 2/1911 | Germany. |
| 880,106 | 10/1961 | Great Britain. |

RICHARD C. QUEISSER, *Primary Examiner.*

E. D. GILHOOLY, *Assistant Examiner.*